(12) United States Patent
Wong et al.

(10) Patent No.: US 9,992,323 B2
(45) Date of Patent: Jun. 5, 2018

(54) ACTIVITY INFORMATION SHARING METHOD AND APPARATUS

(71) Applicant: Tencent Technology (Shenzhen) Company Limited, Shenzhen (CN)

(72) Inventors: Tat Hei Wong, Shenzhen (CN); Jin Fang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days. days.

(21) Appl. No.: 15/627,128

(22) Filed: Jun. 19, 2017

(65) Prior Publication Data
US 2017/0289340 A1   Oct. 5, 2017

Related U.S. Application Data

(63) Continuation of application No. PCT/CN2016/077123, filed on Mar. 23, 2016.

(30) Foreign Application Priority Data

Apr. 28, 2015 (CN) .......................... 2015 1 0208336

(51) Int. Cl.
*H04W 4/00* (2018.01)
*H04M 1/725* (2006.01)
(Continued)

(52) U.S. Cl.
CPC ........ *H04M 1/72561* (2013.01); *H04L 51/32* (2013.01); *H04L 67/20* (2013.01); *H04M 1/7253* (2013.01)

(58) Field of Classification Search
CPC ..... H04W 4/008; H04W 4/001; H04W 84/12; H04W 4/023; H04W 72/085
See application file for complete search history.

(56) References Cited

U.S. PATENT DOCUMENTS

| 8,156,442 B2* | 4/2012 | Aoki | ...................... G06Q 10/10 345/169 |
| 2009/0327885 A1* | 12/2009 | Aoki | ...................... G06Q 10/10 715/700 |
| 2014/0201285 A1 | 7/2014 | Kong | |

FOREIGN PATENT DOCUMENTS

| CN | 102077554 A | 5/2011 |
| CN | 103001926 A | 3/2013 |

(Continued)

OTHER PUBLICATIONS

Tencent Technology, ISR, PCT/CN2016/077123, dated Jun. 23, 2016, 2 pgs.

(Continued)

*Primary Examiner* — Diane Mizrahi
(74) *Attorney, Agent, or Firm* — Morgan, Lewis & Bockius LLP

(57) ABSTRACT

A real-time activity information sharing method performed at a user terminal include: invoking, by the user terminal, an activity tracking application running on the user terminal; establishing, by the user terminal, a near field communication connection between the activity tracking application and a real-time activity information collection apparatus located adjacent the user terminal; executing, by the user terminal, a control instruction on the activity tracking application that causes the real-time activity information collection apparatus to processes real-time activity information associated with a user of the user terminal; receiving, by the user terminal, real-time activity information collected by the real-time activity information collection apparatus of a current activity of the user on the activity tracking application; and sharing, by the user terminal, the real-time activity information on a social networking application by using the control instruction on the activity tracking application running on the user terminal.

18 Claims, 5 Drawing Sheets

(51) Int. Cl.
 *H04L 12/58* (2006.01)
 *H04L 29/08* (2006.01)

(56) References Cited

FOREIGN PATENT DOCUMENTS

| | | |
|---|---|---|
| CN | 103581287 A | 2/2014 |
| CN | 104348612 A | 2/2015 |
| CN | 104394946 A | 3/2015 |

OTHER PUBLICATIONS

Tencent Technology, Written Opinion, PCT/CN2016/077123, dated Jun. 23, 2016, 5 pgs.
Tencent Technology, IPRP, PCT/CN2016/077123, dated Oct. 31, 2017, 6 pgs.

* cited by examiner

ACTIVITY INFORMATION SHARING METHOD AND APPARATUS

PRIORITY CLAIM AND RELATED APPLICATION

This application is a continuation application of PCT Patent Application No. PCT/CN2016/077123, entitled "ACTIVITY INFORMATION SHARING METHOD AND APPARATUS" filed on Mar. 23, 2016, which claims priority to Chinese Patent Application No. 201510208336.1, entitled "ACTIVITY INFORMATION SHARING METHOD AND APPARATUS" filed on Apr. 28, 2015, both of which are incorporated by reference in their entirety.

FIELD OF THE TECHNOLOGY

The present disclosure relates to the field of Internet technologies, and in particular, to a real-time activity information sharing method and apparatus.

BACKGROUND OF THE DISCLOSURE

With the development of Internet technologies, people usually share activities around them through the Internet. For example, people post information about their activities such as dinner parties, karaoke parties, and exercise on social networking websites, or send information about their activities such as dinner parties, karaoke parties, and exercise to friends by using chat software, so as to share their happiness with friends. At present, people usually share information about these activities through the Internet after these activities are over, or share information about these activities during these activities. However, in the two technologies, people need to manually edit information about activities on user terminals during the activities, and in many activities, it is inconvenient for people to use user terminals. For example, when drinking coffee with a guest, a person finds it too inconsiderate to operate a user terminal in front of the guest, and consequently, the user terminal cannot obtain information about the activity in time; or when exercising in a gym, a person finds it inconvenient to operate a user terminal during exercise such as running and dumbbell lifting. In this case, the user terminal cannot obtain information about the activity in time. It can be seen that currently there are problems that information about an activity cannot be obtained and sharing efficiency is relatively low.

SUMMARY

Embodiments of the present application provide a real-time activity information sharing method and apparatus, to obtain real-time activity information in time and improve efficiency of sharing real-time activity information.

According to an aspect, an embodiment of the present application provides a real-time activity information sharing method, including:

establishing, by a user terminal, a communication connection with a real-time activity information collection apparatus;

executing, by the user terminal, a control instruction that processes real-time activity information collected by the real-time activity information collection apparatus and is bound to the real-time activity information collection apparatus;

receiving, by the user terminal through the communication connection, real-time activity information, collected by the real-time activity information collection apparatus, of a current activity; and sharing, by the user terminal, the real-time activity information by using the control instruction.

According to another aspect, an embodiment of the present application provides a real-time activity information sharing apparatus, including: a connection unit, an execution unit, a first receiving unit, and a sharing unit, the connection unit being configured to establish a communication connection with a real-time activity information collection apparatus;

the execution unit being configured to execute a control instruction that processes real-time activity information collected by the real-time activity information collection apparatus and is bound to the real-time activity information collection apparatus;

the first receiving unit being configured to receive, through the communication connection, real-time activity information, collected by the real-time activity information collection apparatus, of a current activity; and the sharing unit being configured to share the real-time activity information by using the control instruction.

In the technical solutions, a user terminal establishes a communication connection with a real-time activity information collection apparatus; the user terminal executes a control instruction that processes real-time activity information collected by the real-time activity information collection apparatus and is bound to the real-time activity information collection apparatus; the user terminal receives, through the communication connection, real-time activity information, collected by the real-time activity information collection apparatus, of a current activity; and the user terminal shares the real-time activity information by using the control instruction. In this way, real-time activity information can be obtained by using a real-time activity information collection apparatus, so that real-time activity information can be obtained in time, and efficiency of sharing real-time activity information can be improved.

BRIEF DESCRIPTION OF THE DRAWINGS

To describe the technical solutions in the embodiments of the present application or in the existing technologies more clearly, the following briefly describes the accompanying drawings required for describing the embodiments or the existing technologies. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly and completely describes the technical solutions in the embodiments of the present application with reference to the accompanying drawings in the embodiments of the present application. Apparently, the described embodiments are some of the embodiments of the present application rather than all of the embodiments. All other embodiments obtained by a person of ordinary skill in the art based on the embodiments of the present application without creative efforts shall fall within the protection scope of the present disclosure.

Figure 1:
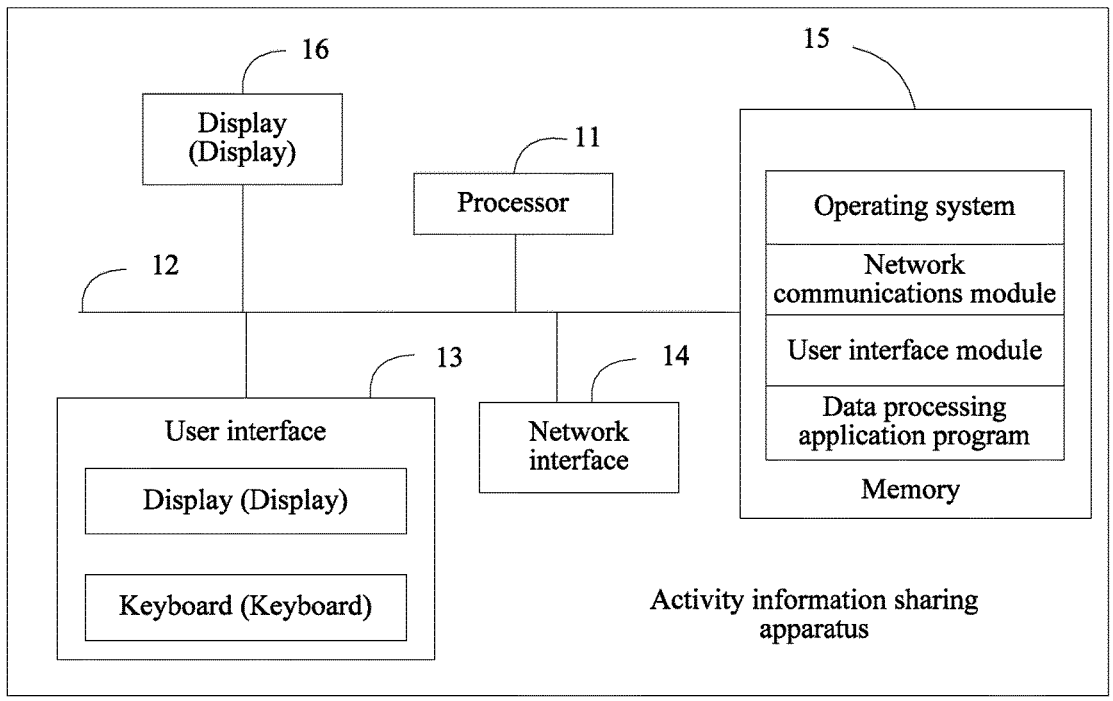
FIG. 1 is a schematic structural diagram of another real-time activity information sharing apparatus according to an embodiment of the present application.

Referring to FIG. 1, FIG. 1 is a schematic structural diagram of another real-time activity information sharing apparatus according to an embodiment of the present application. As shown in FIG. 1, the real-time activity information sharing apparatus includes: at least one processor 11, for example, a central processing unit (CPU), at least one network interface 14, a user interface 13, a memory 15, and at least one communication bus 12. The communication bus 12 is configured to implement connection and communication between these components. The user interface 13 may include a display, a keyboard, and optionally, the user interface 13 may further include a standard wired interface and wireless interface. Optionally, the network interface 14 may include a standard wired interface and wireless interface (for example, a Wi-Fi interface, a Bluetooth interface). The memory 15 may be a high-speed random access memory (RAM) memory, or may be a non-volatile memory, for example, at least one magnetic disk memory. Optionally, the memory 15 may further be at least one storage apparatus that is located far away from the processor 101. As shown in FIG. 1, as a non-transitory computer readable storage medium, the memory 15 may include an operating system, a network communications module, a user interface module, and a data processing APP.

In a data processing apparatus shown in FIG. 1, when the apparatus is a user terminal, the network interface 14 is mainly configured to connect to a server, and perform data communication with the server.

The processor 11 may be configured to call the data processing APP stored in the memory 15, and perform the following operations:

establishing a communication connection with a real-time activity information collection apparatus;

executing a control instruction that processes real-time activity information collected by the real-time activity information collection apparatus and is bound to the real-time activity information collection apparatus;

receiving, through the communication connection, real-time activity information, collected by the real-time activity information collection apparatus, of a current activity; and sharing the real-time activity information by using the control instruction.

In this embodiment, the communication connection may be established with the real-time activity information collection apparatus by using the network interface 14, and the real-time activity information is shared by using the network interface 14.

In addition, in this embodiment, the control instruction may be an application program, or may be a set of some instructions.

Optionally, the operation, performed by the processor 11, of sharing the real-time activity information by using the control instruction may include:

sending the real-time activity information to a server by using the control instruction, where the real-time activity information carries activity time information; and the method further includes:

sending a search request to the server, where the search request is used to search for a user who is performing the current activity within a same time; and receiving user information, sent by the server in response to the search request, of a target user, where the target user is a user who is performing the current activity within a time corresponding to the activity time information.

Optionally, the real-time activity information may carry duration of a target action in the current activity; the search request may be used to search for a user who is performing the target action of the current activity within a same time, and the operation, performed by the processor 11, of receiving user information, sent by the server in response to the search request, of a target user may include:

receiving the user information, sent by the server in response to the search request, of the target user, where the target user is a user who is performing the target action of the current activity within a time corresponding to the duration.

Optionally, operations performed by the processor 11 may further include:

sending a friend request to the target user; and receiving a response message sent by the target user in response to the friend request.

Optionally, the operation, performed by the processor 11, of sharing the real-time activity information by using the control instruction may include:

sending the real-time activity information to the server by using the application program.

Operations performed by the processor 11 may further include:

receiving user feature information sent by the server, where the user feature information includes user feature information calculated by the server based on at least one piece of the real-time activity information.

Optionally, the current activity may include any one of the following:

an exercise activity, a food-and-beverage activity, and an entertainment activity.

In this embodiment, a communication connection is established with a real-time activity information collection apparatus; a control instruction that processes real-time activity information collected by the real-time activity information collection apparatus and is bound to the real-time activity information collection apparatus is executed; real-time activity information, collected by the real-time activity information collection apparatus, of a current activity of a user is received through the communication connection; and the real-time activity information is shared by using the control instruction. In this way, real-time activity information can be obtained by using a real-time activity information collection apparatus, so that real-time activity information can be obtained in time, and efficiency of sharing real-time activity information can be improved.

Figure 2:
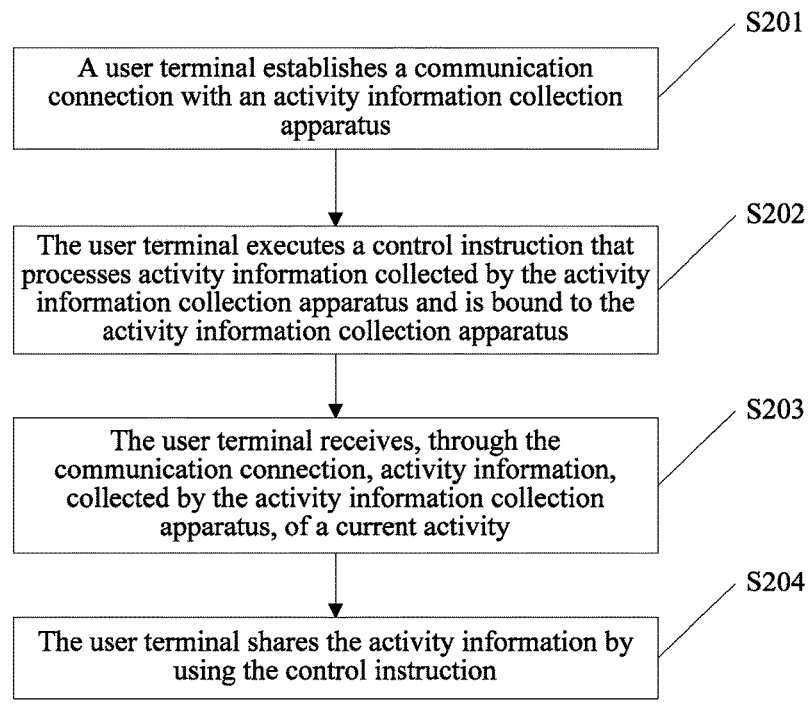
FIG. 2 is a flowchart of a real-time activity information sharing method according to an embodiment of the present application.

Referring to FIG. 2, FIG. 2 is a flowchart of a real-time activity information sharing method according to an embodiment of the present application. As shown in FIG. 2, the method includes the following steps:

S201: A user terminal establishes a communication connection with a real-time activity information collection apparatus.

When a user is performing a current activity, the user terminal may detect the real-time activity information collection apparatus and establish a communication connection with the real-time activity information collection apparatus by means of a near field communication function. For example, when a user is drinking coffee and a user terminal of the user detects a smart food-and-beverage apparatus, the user terminal may establish a communication connection with the smart food-and-beverage apparatus at this time; or when a user is exercising and a user terminal of the user detects a smart exercise apparatus, the user terminal may establish a communication connection with the smart exercise apparatus at this time.

In this embodiment, the user terminal may include the apparatus shown in FIG. 1. For example, in Step S201, a communication connection may be established with the real-time activity information collection apparatus by using the network interface 14 shown in FIG. 1.

S202: The user terminal executes a control instruction that processes real-time activity information collected by the real-time activity information collection apparatus and is bound to the real-time activity information collection apparatus.

In this embodiment, the control instruction may be understood as an application program, for example, a smart food-and-beverage service APP, or a smart exercise APP. In addition, the execution may be to start the application program, or to switch to the application program.

In addition, in this embodiment, the control instruction may be a set of instructions, and the set of instructions may process and share real-time activity information.

In addition, in this embodiment, the control instruction may be pre-stored in the memory 15 shown in FIG. 1.

S203: The user terminal receives, through the communication connection, real-time activity information, collected by the real-time activity information collection apparatus, of a current activity.

When a user is performing a current activity, the real-time activity information collection apparatus may collect real-time activity information of the current activity. For example, a smart food-and-beverage apparatus collects real-time activity information of current food and beverage of a user, for example, information such as a temperature and a PH value of coffee that the user is currently drinking, and information such as an action and a time of drinking the coffee by the user; or a smart exercise apparatus collects real-time activity information of current exercise of a user, for example, exercise information such as an action and a time of the current exercise of the user. In addition, the user described herein may be a user of the user terminal, or may be a user who is currently near the user terminal.

S204: The user terminal shares the real-time activity information by using the control instruction.

After the real-time activity information is obtained, the real-time activity information may be shared by using the control instruction. For example, the real-time activity information is uploaded to a server, or the real-time activity information is uploaded to a social networking website, or the real-time activity information is sent to a client of a friend.

The method is applied to any smart device that has a network function. The smart device that has a network function is, for example, a tablet computer, a mobile phone, an e-reader, a remote control, a personal computer (PC), a notebook computer, an in-vehicle device, a web television, or a wearable device.

In this embodiment, a user terminal establishes a communication connection with a real-time activity information collection apparatus; the user terminal executes a control instruction that processes real-time activity information collected by the real-time activity information collection apparatus and is bound to the real-time activity information collection apparatus; the user terminal receives, through the communication connection, real-time activity information, collected by the real-time activity information collection apparatus, of a current activity; and the user terminal shares the real-time activity information by using the control instruction. In this way, real-time activity information can be obtained by using a real-time activity information collection apparatus, so that real-time activity information can be obtained in time, and efficiency of sharing real-time activity information can be improved.

Figure 3:
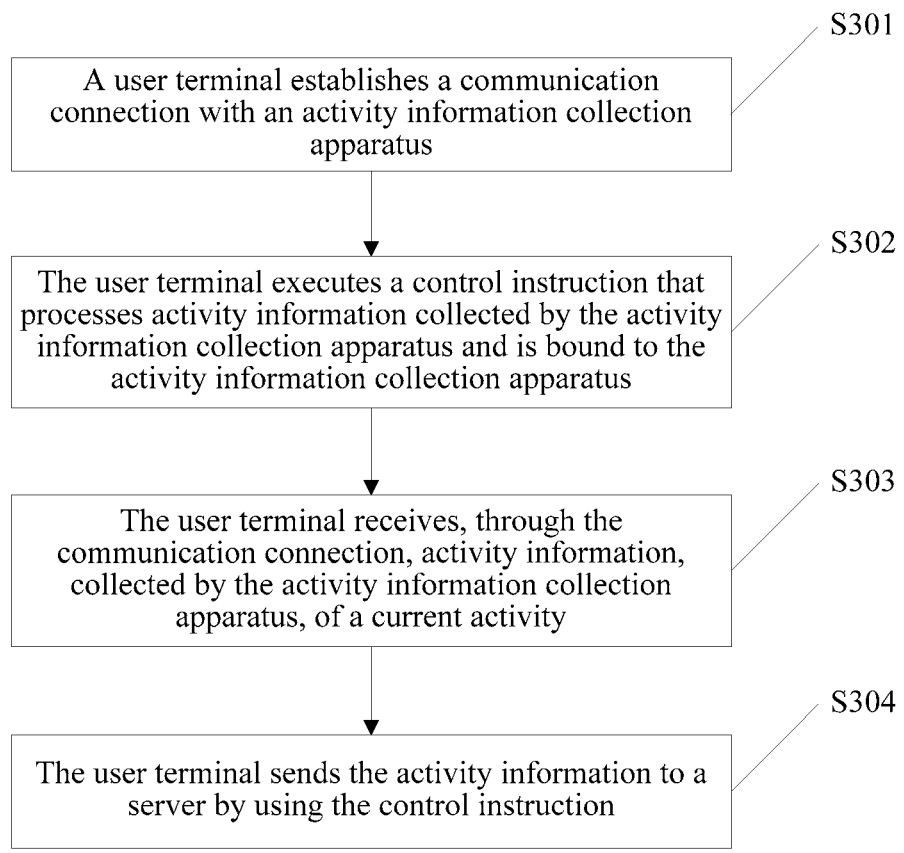
FIG. 3 is a flowchart of another real-time activity information sharing method according to an embodiment of the present application.

Referring to FIG. 3, FIG. 3 is a flowchart of another real-time activity information sharing method according to an embodiment of the present application. As shown in FIG. 3, the method includes the following steps:

S301: A user terminal establishes a communication connection with a real-time activity information collection apparatus.

In this embodiment, wireless communication such as a Wi-Fi wireless network, Bluetooth, and radio frequency (RF) may be used to establish the communication connection with the real-time activity information collection apparatus. For example, in Step 301, the communication connection may be established with the real-time activity information collection apparatus by using the network interface 14 of the apparatus shown in FIG. 1. The network interface 14 may be a wireless communication interface such as a Wi-Fi wireless network, Bluetooth, and RF.

S302: The user terminal executes a control instruction that processes real-time activity information collected by the real-time activity information collection apparatus and is bound to the real-time activity information collection apparatus.

The control instruction that is bound to the real-time activity information collection apparatus may be bound to the real-time activity information collection apparatus in advance, or bound to the real-time activity information collection apparatus in real time. For example, when the real-time activity information collection apparatus is detected, a control instruction corresponding to an activity collected by the real-time activity information collection apparatus may be used as the control instruction that is bound to the real-time activity information collection apparatus. For example, in the apparatus shown in FIG. 1, the processor 11 calls the control instruction stored in the memory 15, and executes the control instruction.

S303: The user terminal receives, through the communication connection, real-time activity information, collected by the real-time activity information collection apparatus, of a current activity.

S304: The user terminal sends the real-time activity information to a server by using the control instruction.

The server may be a server corresponding to the control instruction. For example, if the control instruction is a smart food-and-beverage APP, the server may be a smart food-and-beverage social networking server, or if the control instruction is a smart exercise APP, the server may be a smart exercise social networking server.

In this embodiment, the real-time activity information may carry activity time information, and the method may further include the following steps:

sending, by the user terminal, a search request to the server, where the search request is used to search for a user who is performing the current activity within a same time; and receiving, by the user terminal, user information, sent by the server in response to the search request, of a target user, where the target user is a user who is performing the current activity within a time corresponding to the activity time information.

By means of the foregoing steps, users who are performing a same activity within a same time may be found. For example, users who are drinking coffee within a same time are found, or users who are lifting weight or running within a same time are found.

In addition, the same time may be a same time range, for example, a same minute or a same quarter.

In this implementation manner, the real-time activity information may carry duration of a target action in the current activity. The search request may be used to search for a user who is performing the target action of the current activity within a same time.

The step of receiving, by the user terminal, user information, sent by the server in response to the search request, of a target user may include:

receiving the user information, sent by the server in response to the search request, of the target user, where the target user is a user who is performing the target action of the current activity within a time corresponding to the duration.

By using this implementation manner, users who are performing a same activity and a same action within a same time are found. For example, users who are drinking coffee and raising cups within a same time, or users who are attending a dinner party and raising glasses within a same time, or users who are singing a high-pitched song within a same time, or users who are having a rest in the middle of running.

Specifically, the server may receive real-time activity information shared by multiple users, and then select the target user from the real-time activity information, thereby reflecting user information of the target user.

In addition, the user information may include account information or identity information such as a user ID, social networking website account information, and instant messaging account information of a user.

In this implementation manner, the method may further include the following steps:

sending, by the user terminal, a friend request to the target user; and receiving, by the user terminal, a response message sent by the target user in response to the friend request.

In this way, by means of the foregoing search steps, a friend request may be sent to the target user, so that the target user is added as a friend.

In addition, the target user may further be a user who is in a specified position range. For example, the real-time activity information shared in Step 204 may further carry current position information. In this case, the target user may be a user who is in a position corresponding to the current position information.

In this embodiment, the method may further include the following step:

receiving, by the user terminal, user feature information sent by the server, where the user feature information includes user feature information calculated by the server based on at least one piece of the real-time activity information.

The user feature information may be user feature information calculated according to real-time activity information shared by a user. The user feature information is, for example, habit feature information of a user in a food-and-beverage activity, or habit feature information of a user in an exercise activity. In addition, the user feature information may further be calculated based on real-time activity information of multiple users, for example, rank information of users.

In this embodiment, the current activity may include any one of the following:

an exercise activity, a food-and-beverage activity, and an entertainment activity.

In this embodiment, various optional implementation manners are added based on the embodiment shown in FIG. 2, and real-time activity information can be obtained in time, and efficiency of sharing real-time activity information can be improved.

Figure 4:
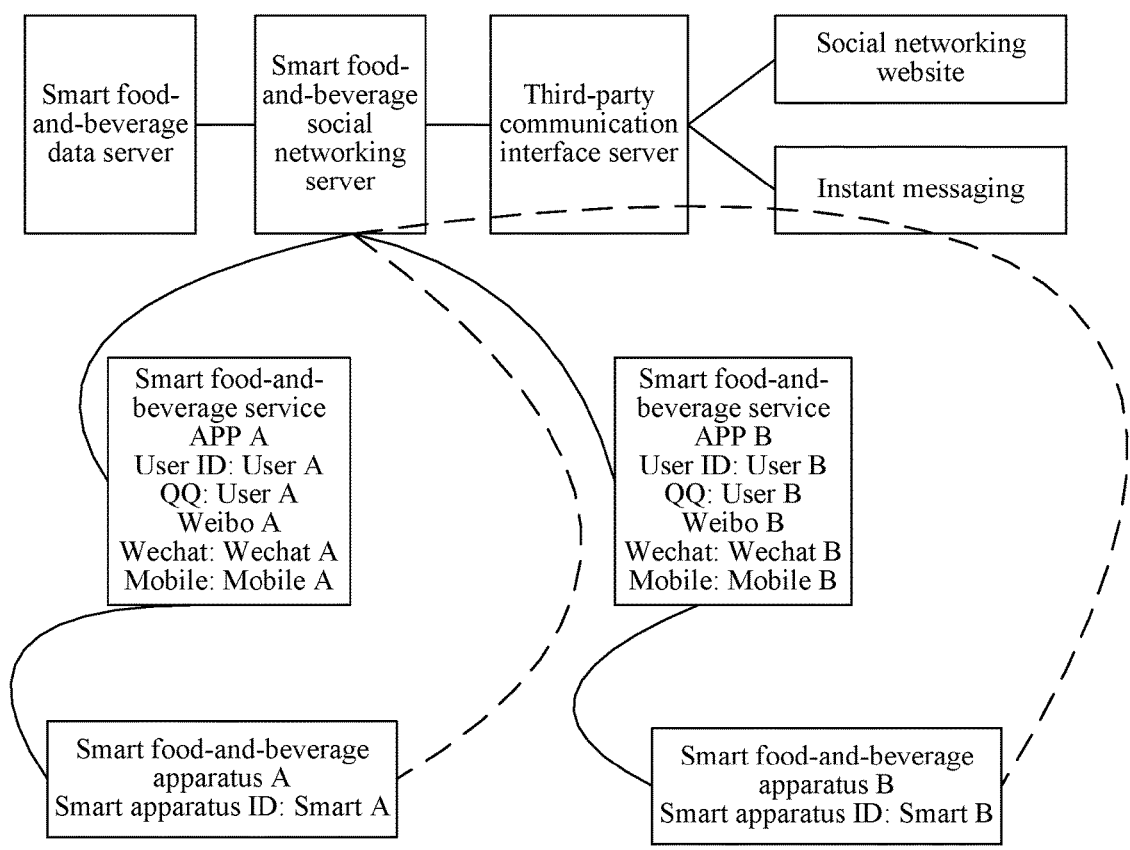
FIG. 4 is a schematic diagram of an example of a system architecture according to an embodiment of the present application.

Referring to FIG. 4, FIG. 4 is a schematic diagram of an example of a system architecture according to an embodiment of the present application. In this embodiment, a food-and-beverage activity is used as an example for description. As shown in FIG. 4, the system architecture includes: a smart food-and-beverage apparatus A, a smart food-and-beverage apparatus B, a smart food-and-beverage service APP A, a smart food-and-beverage service APP B, a smart food-and-beverage server, a smart food-and-beverage social networking server, and a third-party communication interface server.

When a user A receives a smart food-and-beverage apparatus A filled with coffee, a mobile phone of the user may be placed near the smart food-and-beverage apparatus A. By means of a near field communication function, the mobile phone detects the smart food-and-beverage apparatus A, establishes a communication connection with the smart food-and-beverage apparatus A, and starts a smart food-and-beverage service APP A. In addition, after starting the smart food-and-beverage service APP A, the mobile phone establishes a network connection with the smart food-and-beverage apparatus A by means of a network, reads data such as a temperature and a PH value of the coffee, where the data is sensed by a sensor of the smart food-and-beverage apparatus A, and displays the data on the smart food-and-beverage service APP A of the mobile phone in real time. In addition, an acceleration sensor may sense an action performed by the user, where the action is, for example, raising a coffee cup or stirring coffee with a spoon provided with a sensor, and reflects the action on the smart food-and-beverage service APP A. The data may be transmitted to a smart food-and-beverage server and a smart food-and-beverage social networking server in real time.

Figure 5:
FIG. 5 is a schematic diagram of an interface of an application program according to an embodiment of the present application.
Figure 5:
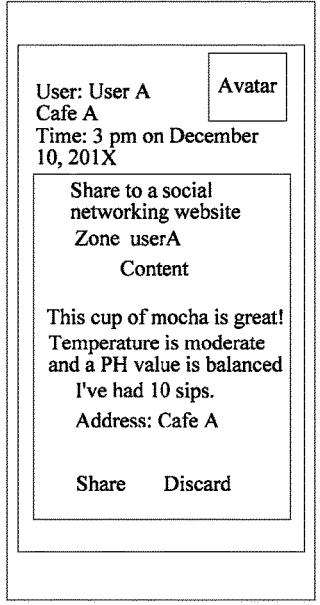
Figure 5:
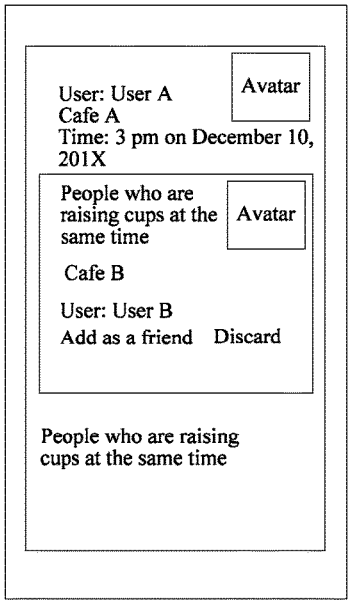

In addition, when obtaining real-time activity information, the smart food-and-beverage service APP A may display interfaces shown in FIG. 5. An interface shown in FIG. 5A may include information about a user name, a cafe, a time, a drink, a temperature, a quantity of times of stirring, a quantity of times of drinking, ratings, and the like. In addition, the interface may further include a virtual button for sharing information to a social networking website or a virtual button for searching for people who are raising cups at the same time. In this way, when a user presses the virtual button for sharing information to a social networking website, an interface shown in FIG. 5B may be displayed. The interface may include a social networking website to which the information is to be shared, information to be shared, and buttons for confirming sharing or for discarding sharing. When the user presses the button to confirm sharing, the information may be shared to the social networking website. In addition, when the user presses the virtual button for searching for people who are raising cups at the same time, an interface shown in FIG. 5C may be displayed. Content of the interface may be user information obtained by the smart food-and-beverage social networking server from the smart food-and-beverage service APP B. In this case, the user may press a button of whether to add a user B. By means of the foregoing technical solution, information about a current activity of a user may be shared to a social networking website, or a user who is raising a cup within a same time may be added as a friend.

Apparatus embodiments of the present application are provided below. The apparatus embodiments of the present application are used for performing methods implemented in Embodiment 1 and Embodiment 2 of the present application. For ease of description, only parts related to the embodiments of the present application are shown. For specific technical details that are not disclosed, refer to Embodiment 1 and Embodiment 2 of the present application.

Figure 6:
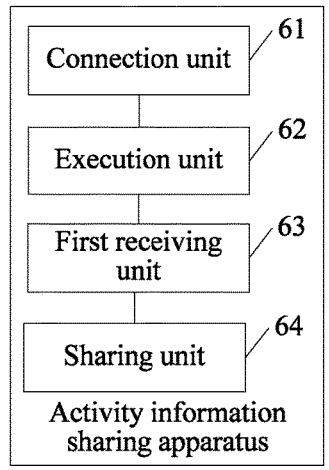
FIG. 6 is a schematic structural diagram of a real-time activity information sharing apparatus according to an embodiment of the present application.

Referring to FIG. 6, FIG. 6 is a schematic structural diagram of a real-time activity information sharing apparatus according to an embodiment of the present application. As shown in FIG. 6, the apparatus includes: a connection unit 61, an execution unit 62, a first receiving unit 63, and a sharing unit 64.

The connection unit 61 is configured to establish a communication connection with a real-time activity information collection apparatus.

When a user is performing a current activity, a user terminal may detect the real-time activity information collection apparatus and establish the communication connection with the real-time activity information collection apparatus by means of a near field communication function. For example, when a user is drinking coffee and a user terminal of the user detects a smart food-and-beverage apparatus, in this case, the user terminal may establish a communication connection with the smart food-and-beverage apparatus; or when a user is exercising and a user terminal of the user detects a smart exercise apparatus, in this case, the user terminal may establish a communication connection with the smart exercise apparatus.

In this embodiment, the user terminal may include the apparatus shown in FIG. 1. For example, the connection unit 51 may establish the communication connection with the real-time activity information collection apparatus by using the network interface 14 shown in FIG. 1.

The execution unit 62 is configured to execute a control instruction that processes real-time activity information collected by the real-time activity information collection apparatus and is bound to the real-time activity information collection apparatus.

In this embodiment, the control instruction may be understood as an application program, for example, a smart exercise APP. In addition, the execution may be to start the application program, or to switch to the application program.

In addition, in this embodiment, the control instruction may be a set of instructions, and the set of instructions may process and share real-time activity information.

In addition, in this embodiment, the control instruction may be pre-stored in the memory 15 shown in FIG. 1.

The first receiving unit 63 is configured to receive, through the communication connection, real-time activity information, collected by the real-time activity information collection apparatus, of a current activity.

When a user is performing a current activity, the real-time activity information collection apparatus may collect real-time activity information of the current activity of the user. For example, a smart food-and-beverage apparatus collects real-time activity information of current food and beverage of a user, for example, information such as a temperature and a PH value of coffee that the user is currently drinking, and information such as an action and a time of drinking the coffee the user; or a smart exercise apparatus collects real-time activity information of current exercise of a user, for example, exercise information such as an action and a time of the current exercise of the user. In addition, the user described herein may be a user of the user terminal, or may be a user who is currently near the user terminal.

The sharing unit 64 is configured to share the real-time activity information by using the control instruction.

After the real-time activity information is obtained, the real-time activity information may be shared by using the control instruction. For example, the real-time activity information is uploaded to a server, or the real-time activity information is uploaded to a social networking website, or the real-time activity information is sent to a client of a friend.

According to an embodiment of the present application, the real-time activity information sharing method shown in FIG. 2 may be a man-machine interaction method performed by each unit in the real-time activity information sharing apparatus shown in FIG. 6. For example, Step S201 shown in FIG. 2 may be performed by the connection unit 61 shown in FIG. 6, Step S202 shown in FIG. 2 may be performed by the execution unit 62 shown in FIG. 6, Step S203 shown in FIG. 2 may be performed by the first receiving unit 63 shown in FIG. 6, and Step S204 shown in FIG. 2 may be performed by the sharing unit 64 shown in FIG. 6.

According to another embodiment of the present application, units of the real-time activity information sharing apparatus shown in FIG. 6 may be separately or completely combined into one or several other units, or one (or more) of the units herein may further be divided into multiple units of smaller functions. In this way, same operations can be implemented, and implementation of the technical effects of the embodiments of the present application is not affected. The foregoing units are divided based on logical functions, and in an actual application, a function of one unit may also be implemented by using multiple units, or functions of multiple units may be implemented by using one unit. In other embodiments of the present application, a terminal device may also include other modules. However, in an actual application, these functions may also be cooperatively implemented by using another unit and may be cooperatively implemented by using multiple units.

According to another embodiment of the present application, the real-time activity information sharing apparatus shown in FIG. 6 may be constructed and the real-time activity information sharing method according to the embodiments of the present application may be implemented by executing, on a general-purpose computing device such as a computer that includes processing elements and storage elements such as a CPU, a RAM, and a read-only memory (ROM), computer programs (including program code) that can execute the real-time activity information sharing method shown in FIG. 2. The computer program may be recorded in, for example, a computer readable recording medium, and may be loaded into the foregoing computing device by using the computer readable recording medium and be executed in the computing device.

The apparatus is applied to any smart device that has a network function. The smart device that has a network function is, for example, a tablet computer, a mobile phone, an e-reader, a remote control, a PC, a notebook computer, an in-vehicle device, a web television, or a wearable device.

In this embodiment, a communication connection is established with a real-time activity information collection apparatus; a control instruction that processes real-time activity information collected by the real-time activity information collection apparatus and is bound to the real-time activity information collection apparatus is executed; real-time activity information, collected by the real-time activity information collection apparatus, of a current activity of a user is received through the communication connection; and the real-time activity information is shared by using the control instruction. In this way, real-time activity information can be obtained by using a real-time activity information collection apparatus, so that real-time activity information can be obtained in time, and efficiency of sharing real-time activity information can be improved.

Figure 7:
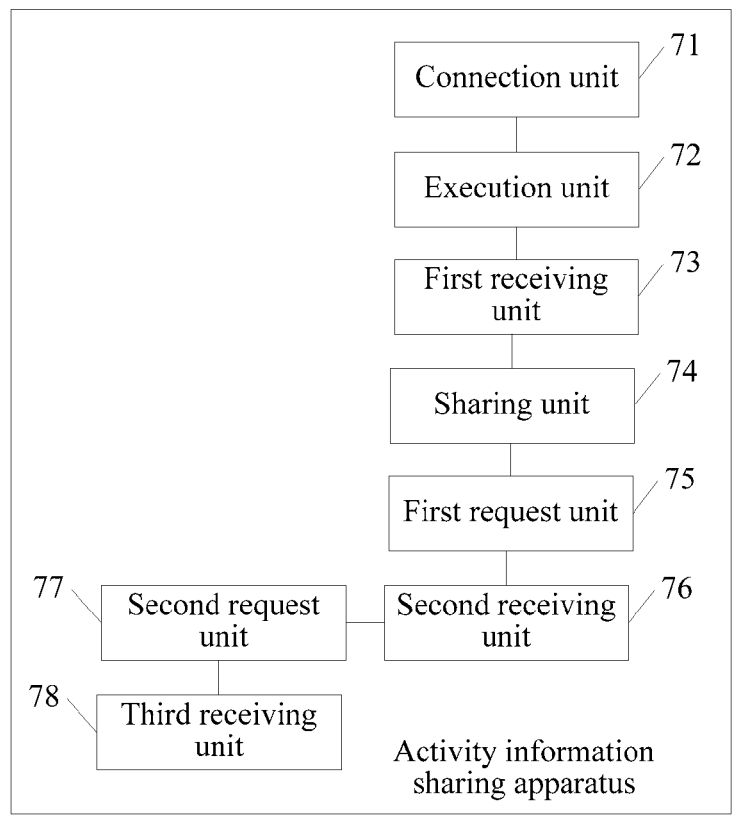
FIG. 7 is a schematic structural diagram of another real-time activity information sharing apparatus according to an embodiment of the present application.

Referring to FIG. 7, FIG. 7 is a schematic structural diagram of another real-time activity information sharing apparatus according to an embodiment of the present application. As shown in FIG. 7, the apparatus includes: a connection unit 71, an execution unit 72, a first receiving unit 73, and a sharing unit 74.

The connection unit 71 is configured to establish a communication connection with a real-time activity information collection apparatus.

In this embodiment, wireless communication such as a Wi-Fi wireless network, Bluetooth, and RF may be used to establish the communication connection with the real-time activity information collection apparatus. For example, the connection unit 71 may establish the communication connection with the real-time activity information collection apparatus by using the network interface 14 of the apparatus shown in FIG. 1. The network interface 14 may be a wireless communication interface such as a Wi-Fi wireless network, Bluetooth, and RF.

The execution unit 72 is configured to execute a control instruction that processes real-time activity information collected by the real-time activity information collection apparatus and is bound to the real-time activity information collection apparatus.

The control instruction that is bound to the real-time activity information collection apparatus may be bound to the real-time activity information collection apparatus in advance, or bound to the real-time activity information collection apparatus in real time. For example, when the real-time activity information collection apparatus is detected, a control instruction corresponding to an activity collected by the real-time activity information collection apparatus may be used as the control instruction that is bound to the real-time activity information collection apparatus. For example, in the apparatus shown in FIG. 1, the processor 11 calls the control instruction stored in the memory 15, and executes the control instruction.

The first receiving unit 73 is configured to receive, through the communication connection, real-time activity information, collected by the real-time activity information collection apparatus, of a current activity of a user.

The sharing unit 74 is configured to share the real-time activity information by using the control instruction.

In this embodiment, the sharing unit 74 may be configured to send the real-time activity information to a server by using the control instruction, where the real-time activity information may carry activity time information.

The server may be a server corresponding to the control instruction. For example, if the control instruction is a smart food-and-beverage APP, the server may be a smart food-and-beverage social networking server, or if the control instruction is a smart exercise APP, the server may be a smart exercise social networking server.

The apparatus may further include:
a first request unit 75, configured to send a search request to the server, where the search request is used to search for a user who is performing the current activity within a same time; and
a second receiving unit 76, configured to receive user information, sent by the server in response to the search request, of a target user, where the target user is a user who is performing the current activity within a time corresponding to the activity time information.

By using the apparatus, users who are performing a same activity within a same time may be found. For example, users who are drinking coffee within a same time are found, or users who are lifting weight or running within a same time are found.

In addition, the same time may be a same time range, for example, a same minute or a same quarter.

In this implementation manner, the real-time activity information may carry duration of a target action in the current activity. The search request may be used to search for a user who is performing the target action of the current activity within a same time.

The second receiving unit 76 may be configured to receive the user information, sent by the server in response to the search request, of the target user, where the target user is a user who is performing the target action of the current activity within a time corresponding to the duration.

By using this implementation manner, users who are performing a same activity and a same action within a same time are found. For example, users who are drinking coffee and raising cups within a same time, or users who are attending a dinner party and raising glasses within a same time, or users who are singing a high-pitched song within a same time, or users who are having a rest in the middle of running.

Specifically, the server may receive real-time activity information shared by multiple users, and then select the target user from the real-time activity information, thereby reflecting user information of the target user.

In addition, the user information may include account information or identity information such as a user ID, social networking website account information, and instant messaging account information of a user.

In this implementation manner, the apparatus may further include:
a second request unit 77, configured to send a friend request to the target user; and
a third receiving unit 78, configured to receive a response message sent by the target user in response to the friend request.

In this way, by means of the foregoing search steps, a friend request may be sent to the target user, so that the target user is added as a friend.

In addition, the target user may further be a user who is in a specified position range. For example, the shared real-time activity information may further carry current position information, and in this case, the target user may be a user who is in a position corresponding to the current position information.

In this embodiment, the sharing unit 74 may be configured to send the real-time activity information to a server by using the control instruction.

Figure 8:
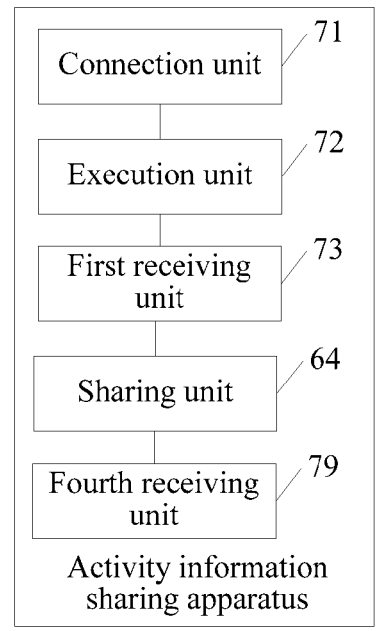
FIG. 8 is a schematic structural diagram of another real-time activity information sharing apparatus according to an embodiment of the present application.

As shown in FIG. 8, the apparatus may further include:
a fourth receiving unit 79, configured to receive user feature information sent by the server, where the user feature information includes user feature information calculated by the server based on at least one piece of the real-time activity information.

The user feature information may be user feature information calculated according to real-time activity information shared by a user. The user feature information is, for example, habit feature information of a user in a food-and-beverage activity, or habit feature information of a user in an exercise activity. In addition, the user feature information may further be calculated based on real-time activity information of multiple users, for example, rank information of users.

In this embodiment, the current activity may include any one of the following:
an exercise activity, a food-and-beverage activity, and an entertainment activity.

In this embodiment, various optional implementation manners are added based on the embodiment shown in FIG. 6, and real-time activity information can be obtained in time, and efficiency of sharing real-time activity information can be improved.

According to an embodiment of the present application, the real-time activity information sharing method shown in FIG. 3 may be a man-machine interaction method performed by each unit in the real-time activity information sharing apparatus shown in FIG. 7. For example, Step S301, S302, S303, and S304 shown in FIG. 3 may be performed respectively by the connection unit 71, the execution unit 72, the first receiving unit 73, and the sharing unit 74 shown in FIG. 7.

According to another embodiment of the present application, units of the real-time activity information sharing apparatus shown in FIG. 7 may be separately or completely combined into one or several other units, or one (or more) of the units herein may further be divided into multiple units of smaller functions. In this way, same operations can be implemented, and implementation of the technical effects of the embodiments of the present application is not affected. The foregoing units are divided based on logical functions, and in an actual application, a function of one unit may also be implemented by using multiple units, or functions of multiple units may be implemented by using one unit. In other embodiments of the present application, a terminal device may also include other modules. However, in an actual application, these functions may also be cooperatively implemented by using another unit and may be cooperatively implemented by using multiple units.

According to another embodiment of the present application, the real-time activity information sharing apparatus shown in FIG. 7 may be constructed and the real-time activity information sharing method according to the embodiments of the present application may be implemented by executing, on a general-purpose computing device such as a computer that includes processing elements and storage elements such as a CPU, a RAM, and a ROM, computer programs (including program code) that can execute the real-time activity information sharing method shown in FIG. 3. The computer program may be recorded in, for example, a computer readable recording medium, and may be loaded into the foregoing computing device by using the computer readable recording medium and be executed in the computing device.

In the descriptions of this specification, the descriptions of a reference term such as "an embodiment", "some embodiments", "an example", "a specific example", or "some examples" refer to that a specific feature, structure, material or feature described with reference to this embodiment or example are included in at least one embodiment or example of the present application. In this specification, schematic descriptions of the foregoing terms are not necessarily for a same embodiment or example. Moreover, the described specific feature, structure, material or feature may be combined in an appropriate manner in any one or more embodiments or examples. In addition, in cases that do not contradict each other, a person skilled in the art may combine different embodiments or examples described in this specification and features of different embodiments or examples.

In addition, the terms "first" and "second" are merely used for description purposes, but cannot be understood as indicating or denoting relative importance, or implicating or specifying the quantity of the indicated technical features. Therefore, features defined by "first" and "second" may explicitly or implicitly include at least one feature. In the descriptions of the present disclosure, "multiple" means at least two, for example, two or three, unless it is otherwise specified.

Descriptions of any process or method described in the flowcharts or herein in other manners may be understood as representing modules, sections, or parts of code that includes one or more executable instructions that are configured to implement steps of specific logical functions or processes, and that the scope of a preferred implementation manner of the present disclosure includes other implementations. Instead of a shown or discussed sequence, the related functions may be executed basically at the same time or in an order reverse to the shown or discussed sequence. This should be understood by a person skilled in the art to which the embodiments of the present application belong.

For example, logic and/or steps represented in the flowcharts or described herein in other manners may be considered as an ordered list of executable instructions that are used to implement logical functions, and may be specifically implemented in any computer-readable medium and used by an instruction execution system, apparatus or device (for example, a computer-based system, a system including a processor, or another system that can obtain an instruction from the instruction execution system, apparatus or device and execute the instruction), or used in combination with the instruction execution system, apparatus or device. In terms of this specification, a "computer-readable medium" may be any apparatus that may include, store, communicate, propagate, or transmit a program for use by the instruction execution system, apparatus or device or for use in combination with the instruction execution system, apparatus or device. A more specific example (nonexhaustive list) of the computer-readable medium includes: an electrical connection part (an electronic apparatus) having one or more cable layouts, a portable computing cassette (a magnetic apparatus), a RAM, a ROM, an erasable programmable ROM (EPROM or a flash memory), a fiber apparatus, and a portable compact disc ROM (CDROM). In addition, the computer-readable medium may even be a paper on which the program may be printed or another appropriate medium, because for example, the paper or the another medium may be optically scanned, and then edited, decrypted, or processed in another appropriate manner when necessary to obtain the program in an electrical manner, so as to store the program in a computer memory.

It should be understood that each part of the present disclosure may be implemented by using hardware, software, firmware, or a combination thereof. In the foregoing implementation manners, multiple steps or methods may be implemented by using software or firmware that is stored in a memory and performed by an appropriate instruction execution system. For example, if each part of the present disclosure is implemented by using hardware, the same as that in another implementation manner, each part may be implemented by using any one of the following technologies well-known in the art or a combination thereof: a discrete logic circuit that has a logic gate circuit configured to implement a logical function for a data signal, an application-specific integrated circuit that has an appropriate combinational logic gate circuit, a programmable gate array (PGA), a field PGA (FPGA), and the like.

A person of ordinary skill in the art may understand that all or a part of the steps carried in the method of the embodiments may be implemented by a program instructing related hardware. The program may be stored in a computer readable storage medium. When the program is executed, one step or a combination of the steps of the method embodiment is performed.

In addition, functional units in the embodiments of the present application may be integrated in one processing module or exist as separate physical units, or two or more units may be integrated in one module. The integrated modules may be implemented in the form of hardware or software functional modules. If the integrated modules are implemented in the form of software functional modules and sold or used as an independent product, the integrated modules may also be stored in a computer-readable storage medium.

The storage medium may be a ROM, a magnetic disk, an optical disc, or the like. Although the embodiments of the present application are shown and described above, it may be understood that the embodiments are exemplary and cannot be construed as limitations to the present disclosure, and a person of ordinary skill in the art may make changes, modifications, replacement, and variations to the embodiments within the scope of the present disclosure.

What is claimed is:

1. A real-time activity information sharing method performed by a user terminal having one or more processors and memory for storing programs to be executed by the one or more personal computers, the method comprising:
    invoking, by the user terminal, an activity tracking application running on the user terminal;
    in response to a home appliance performing a predefined activity:
        establishing, by the user terminal, a near field communication connection between the activity tracking application and a real-time activity information collection apparatus located adjacent the user terminal, wherein the real-time activity information collection apparatus is physically attached to the home appliance and has one or more sensors configured to collect a plurality of parameters uniquely associated with the predefined activity, and the activity tracking application is bound to the real-time activity information collection apparatus via a third-party server;
        executing, by the user terminal, a control instruction on the activity tracking application that causes the one or more sensors of the real-time activity information collection apparatus to be activated and collect the plurality of parameters uniquely associated with the predefined activity, wherein the plurality of parameters is transmitted from the real-time activity information collection apparatus to the user terminal using the near field communication connection;
    receiving, by the user terminal, the plurality of parameters uniquely associated with the predefined activity collected by the one or more sensors of the real-time activity information collection apparatus via the near field communication connection;
    displaying, on a user interface of the user terminal, the plurality of parameters uniquely associated with the predefined activity; and
    sharing, by the user terminal, the plurality of parameters uniquely associated with the predefined activity on a social networking application by using a share instruction on the activity tracking application running on the user terminal.

2. The real-time activity information sharing method according to claim 1, wherein the operation of sharing, by the user terminal, the plurality of parameters uniquely associated with the predefined activity by using the share instruction comprises:
    sending, by the user terminal, the plurality of parameters uniquely associated with the predefined activity to a social networking application server by using the share instruction, wherein the plurality of parameters uniquely associated with the predefined activity carry activity time information;
    sending, by the user terminal, a search request to the social networking application server, wherein the search request is used to search for a second user terminal running the activity tracking application that indicates the predefined activity performed within a same time; and
    receiving, by the user terminal, user information, sent by the social networking application server in response to the search request, of a target user, wherein the target user is a user of the second user terminal running the activity tracking application that indicates the predefined activity performed within a time corresponding to the activity time information.

3. The real-time activity information sharing method according to claim 2, wherein:
    the plurality of parameters uniquely associated with the predefined activity carries duration of a target action in the predefined activity;
    the search request of the user terminal is used to search for a second user terminal running the activity tracking application that indicates the target action of the predefined activity performed within a same time; and
    the operation of receiving, by the user terminal, user information, sent by the social networking application server in response to the search request, of a target user comprises:
        receiving, by the user terminal, the user information, sent by the social networking application server in response to the search request, of the target user, wherein the target user is a user of the second user terminal running the activity tracking application that indicates the target action of the predefined activity performed within a time corresponding to the duration.

4. The real-time activity information sharing method according to claim 2, further comprising:
sending, by the user terminal, a friend request to the target user; and
receiving, by the user terminal, a response message sent by the target user in response to the friend request.

5. The real-time activity information sharing method according to claim 1, wherein the operation of sharing, by the user terminal, the plurality of parameters uniquely associated with the predefined activity by using the share instruction comprises:
sending, by the user terminal, the plurality of parameters uniquely associated with the predefined activity by using the share instruction; and
receiving, by the user terminal, user feature information sent by the social networking application server, wherein the user feature information comprises user feature information calculated by the social networking application server based on at least one of the plurality of parameters uniquely associated with the predefined activity.

6. The real-time activity information sharing method according to claim 1, wherein the predefined activity comprises any one of the following:
an exercise activity, a food-and-beverage activity, and an entertainment activity.

7. A user terminal comprising:
one or more processors;
memory; and
a plurality of programs stored in the memory that, when executed by the one or more processors, cause the user terminal to perform a plurality of operations including:
invoking, by the user terminal, an activity tracking application running on the user terminal;
in response to a home appliance performing a predefined activity:
establishing, by the user terminal, a near field communication connection between the activity tracking application and a real-time activity information collection apparatus located adjacent the user terminal, wherein the real-time activity information collection apparatus is physically attached to the home appliance and has one or more sensors configured to collect a plurality of parameters uniquely associated with the predefined activity, and the activity tracking application is bound to the real-time activity information collection apparatus via a third-party server;
executing, by the user terminal, a control instruction on the activity tracking application that causes the one or more sensors of the real-time activity information collection apparatus to be activated and collect the plurality of parameters uniquely associated with the predefined activity, wherein the plurality of parameters is transmitted from the real-time activity information collection apparatus to the user terminal using the near field communication connection;
receiving, by the user terminal, the plurality of parameters uniquely associated with the predefined activity collected by the one or more sensors of the real-time activity information collection apparatus via the near field communication connection;
displaying, on a user interface of the user terminal, the plurality of parameters uniquely associated with the predefined activity; and
sharing, by the user terminal, the plurality of parameters uniquely associated with the predefined activity on a social networking application by using a share instruction on the activity tracking application running on the user terminal.

8. The user terminal according to claim 7, wherein the operation of sharing, by the user terminal, the plurality of parameters uniquely associated with the predefined activity by using the share instruction comprises:
sending, by the user terminal, the plurality of parameters uniquely associated with the predefined activity to a social networking application server by using the share instruction, wherein the plurality of parameters uniquely associated with the predefined activity carry activity time information;
sending, by the user terminal, a search request to the social networking application server, wherein the search request is used to search for a second user terminal running the activity tracking application that indicates the predefined activity performed within a same time; and
receiving, by the user terminal, user information, sent by the social networking application server in response to the search request, of a target user, wherein the target user is a user of the second user terminal running the activity tracking application that indicates the predefined activity performed within a time corresponding to the activity time information.

9. The user terminal according to claim 8, wherein:
the plurality of parameters uniquely associated with the predefined activity carries duration of a target action in the predefined activity;
the search request of the user terminal is used to search for a second user terminal running the activity tracking application that indicates the target action of the predefined activity performed within a same time; and
the operation of receiving, by the user terminal, user information, sent by the social networking application server in response to the search request, of a target user comprises:
receiving, by the user terminal, the user information, sent by the social networking application server in response to the search request, of the target user, wherein the target user is a second user terminal running the activity tracking application that indicates the target action of the predefined activity performed within a time corresponding to the duration.

10. The user terminal according to claim 8, wherein the plurality of operations further comprise:
sending, by the user terminal, a friend request to the target user; and
receiving, by the user terminal, a response message sent by the target user in response to the friend request.

11. The user terminal according to claim 7, wherein the operation of sharing, by the user terminal, the plurality of parameters uniquely associated with the predefined activity by using the share instruction comprises:
sending, by the user terminal, the plurality of parameters uniquely associated with the predefined activity by using the share instruction; and
receiving, by the user terminal, user feature information sent by the social networking application server, wherein the user feature information comprises user feature information calculated by the social networking server based on at least one of the plurality of parameters uniquely associated with the predefined activity.

12. The user terminal according to claim 7, wherein the predefined activity comprises any one of the following:

an exercise activity, a food-and-beverage activity, and an entertainment activity.

13. A non-transitory computer readable storage medium in conjunction with a user terminal comprising one or more processors, wherein the non-transitory computer readable storage medium stores a plurality of programs that, when executed by the one or more processors, cause the user terminal to perform a plurality of operations including:
invoking, by the user terminal, an activity tracking application running on the user terminal;
in response to a home appliance performing a predefined activity:
establishing, by the user terminal, a near field communication connection between the activity tracking application and a real-time activity information collection apparatus located adjacent the user terminal, wherein the real-time activity information collection apparatus is physically attached to the home appliance and has one or more sensors configured to collect a plurality of parameters uniquely associated with the predefined activity, and the activity tracking application is bound to the real-time activity information collection apparatus via a third-party server;
executing, by the user terminal, a control instruction on the activity tracking application that causes the one or more sensors of the real-time activity information collection apparatus to be activated and collect the plurality of parameters uniquely associated with the predefined activity, wherein the plurality of parameters is transmitted from the real-time activity information collection apparatus to the user terminal using the near field communication connection;
receiving, by the user terminal, the plurality of parameters uniquely associated with the predefined activity collected by the one or more sensors of the real-time activity information collection apparatus via the near field communication connection;
displaying, on a user interface of the user terminal, the plurality of parameters uniquely associated with the predefined activity; and
sharing, by the user terminal, the plurality of parameters uniquely associated with the predefined activity on a social networking application by using a share instruction on the activity tracking application running on the user terminal.

14. The non-transitory computer readable storage medium according to claim 13, wherein the operation of sharing, by the user terminal, the plurality of parameters uniquely associated with the predefined activity by using the share instruction comprises:
sending, by the user terminal, the plurality of parameters uniquely associated with the predefined activity to a social networking application server by using the share instruction, wherein the plurality of parameters uniquely associated with the predefined activity carries activity time information;
sending, by the user terminal, a search request to the social networking application server, wherein the search request is used to search for a second user terminal running the activity tracking application that indicates the predefined activity performed within a same time; and
receiving, by the user terminal, user information, sent by the social networking application server in response to the search request, of a target user, wherein the target user is a user of the second user terminal running the activity tracking application that indicates the predefined activity performed within a time corresponding to the activity time information.

15. The non-transitory computer readable storage medium according to claim 14, wherein:
the plurality of parameters uniquely associated with the predefined activity carries duration of a target action in the predefined activity;
the search request of the user terminal is used to search for a second user terminal running the activity tracking application that indicates the target action of the predefined activity performed within a same time; and
the operation of receiving, by the user terminal, user information, sent by the social networking application server in response to the search request, of a target user comprises:
receiving, by the user terminal, the user information, sent by the social networking application server in response to the search request, of the target user, wherein the target user is a user of the second user terminal running the activity tracking application that indicates the target action of the predefined activity performed within a time corresponding to the duration.

16. The non-transitory computer readable storage medium according to claim 14, wherein the plurality of operations further comprise:
sending, by the user terminal, a friend request to the target user; and
receiving, by the user terminal, a response message sent by the target user in response to the friend request.

17. The non-transitory computer readable storage medium according to claim 13, wherein the operation of sharing, by the user terminal, the plurality of parameters uniquely associated with the predefined activity by using the control instruction comprises:
sending, by the user terminal, the plurality of parameters uniquely associated with the predefined activity by using the share instruction; and
receiving, by the user terminal, user feature information sent by the social networking application server, wherein the user feature information comprises user feature information calculated by the social networking application server based on at least one of the plurality of parameters uniquely associated with the predefined activity.

18. The non-transitory computer readable storage medium according to claim 13, wherein the predefined activity comprises any one of the following:
an exercise activity, a food-and-beverage activity, and an entertainment activity.

* * * * *